Dec. 19, 1944.  H. GREEN  2,365,339
VISCOMETER
Filed Dec. 13, 1941  4 Sheets-Sheet 1

INVENTOR
HENRY GREEN
BY *Francis H. Betz*
ATTORNEY

Dec. 19, 1944. H. GREEN 2,365,339
VISCOMETER
Filed Dec. 13, 1941 4 Sheets-Sheet 2

Fig. 2.

INVENTOR
HENRY GREEN
BY Francis B. Betts
ATTORNEY

Dec. 19, 1944.  H. GREEN  2,365,339
VISCOMETER
Filed Dec. 13, 1941  4 Sheets-Sheet 3
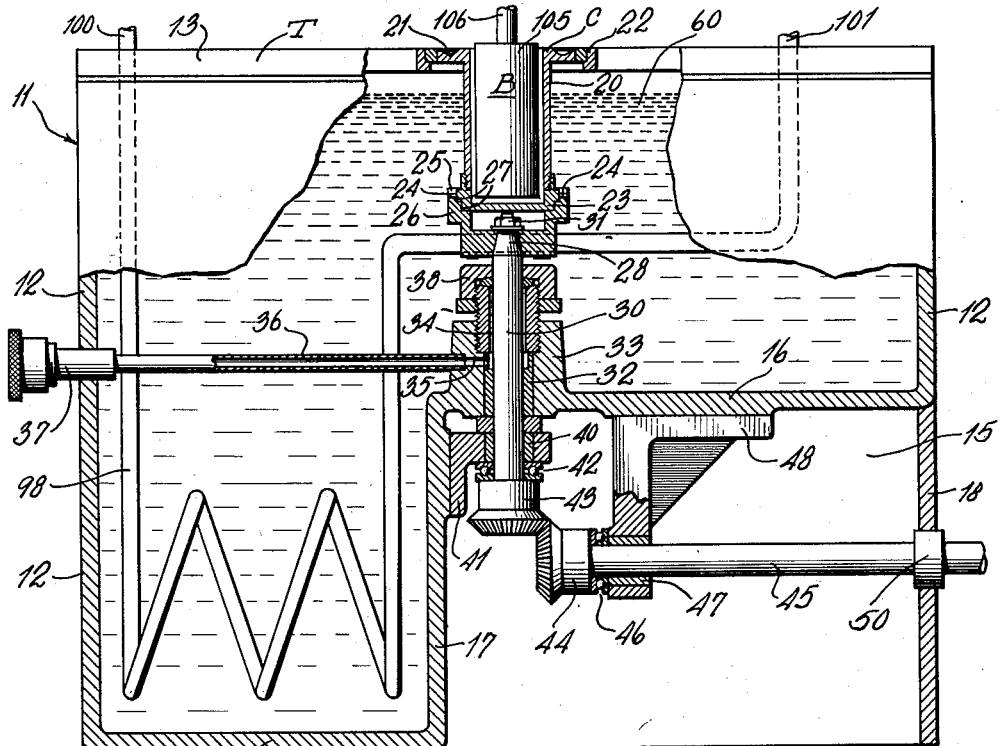
Fig. 3.
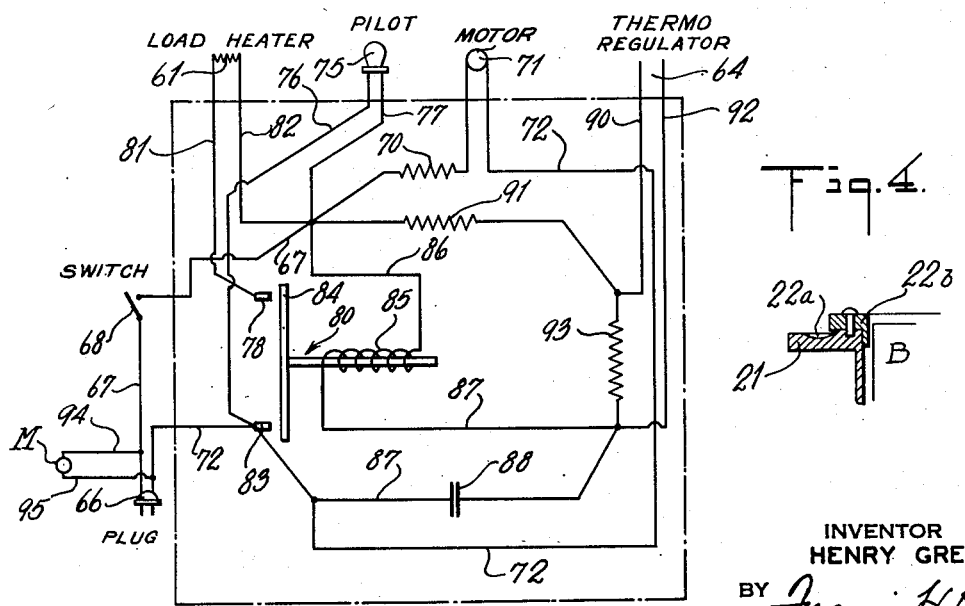
Fig. 4.
Fig. 5.
INVENTOR
HENRY GREEN
BY Francis H. Fetzer
ATTORNEY Dec. 19, 1944.   H. GREEN   2,365,339
VISCOMETER
Filed Dec. 13, 1941   4 Sheets-Sheet 4
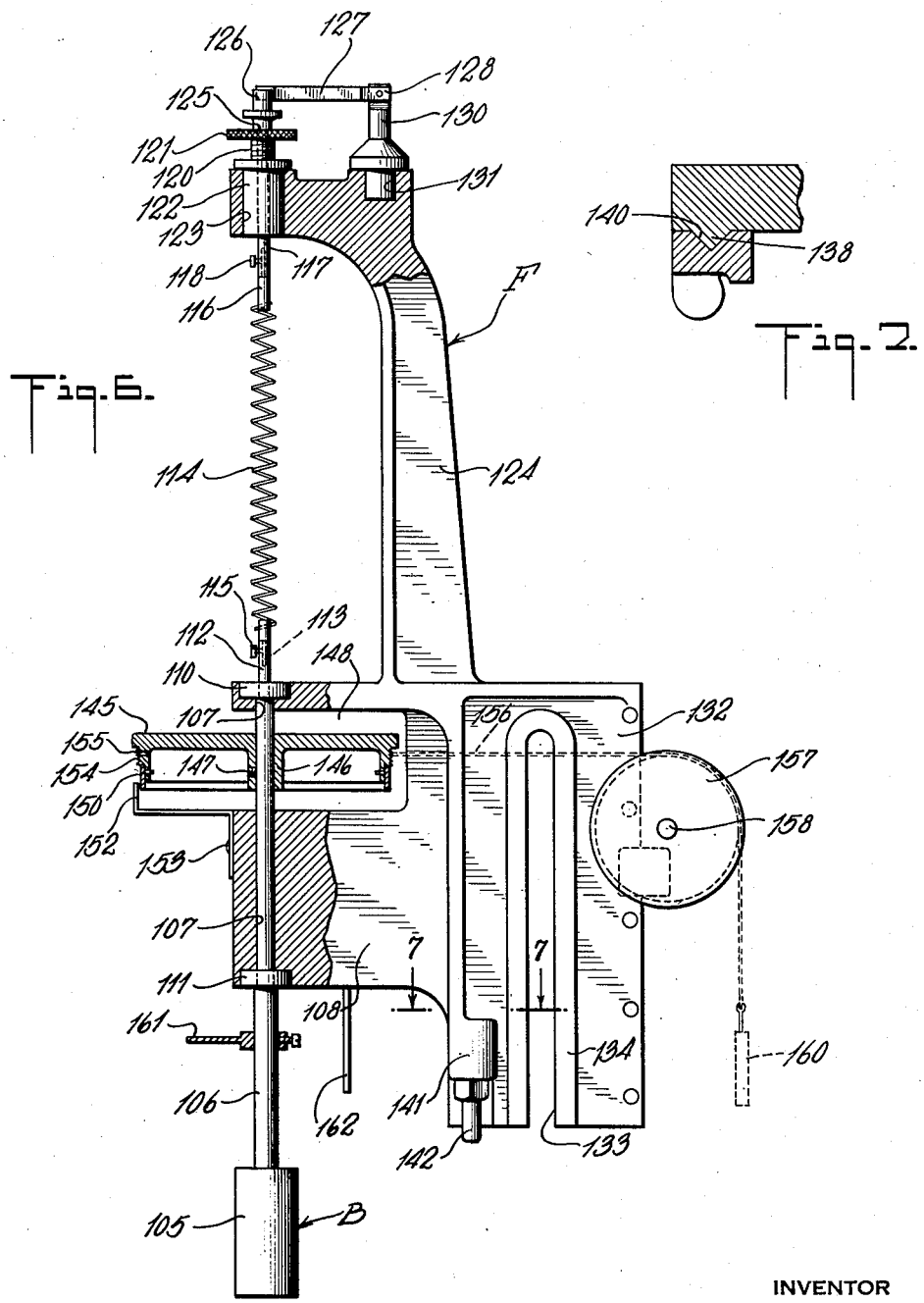
INVENTOR
HENRY GREEN
BY *Francis H. Gehr*
ATTORNEY Patented Dec. 19, 1944

2,365,339

UNITED STATES PATENT OFFICE 2,365,339

VISCOMETER

Henry Green, New York, N. Y., assignor to Interchemical Corporation, New York, N. Y., a corporation of Ohio Application December 13, 1941, Serial No. 422,802

8 Claims. (Cl. 73—54)

This invention relates to rotational viscometers and aims to provide an improved viscometer of the rotating cup type which is particularly adapted to measure quickly and accurately certain of the flow characteristics of plastics and liquids.

In the commercial use of viscometers to study the properties of certain non-solid industrial materials, it is desirable to have an instrument which can be used to measure the viscosity of both plastics and liquids. The principal difference between a plastic and a true liquid is that the former has a yield value while the latter does not. That is, while flow will take place in liquids with any force applied thereto, no matter how small, the force applied to a plastic must reach a certain critical value (the yield value) before flow occurs. It follows that in order properly and accurately to measure the flow characteristics of such materials (viscosity in the case of liquids, and, for plastics, yield value and plastic viscosity, the latter being the reciprocal of the rheological term "mobility"), a viscometer should be selected which is capable of employing at least two pressures or forces so that a flow curve for the material may be plotted. The viscometer should also be built so that a state of streamline or laminar flow is induced during operation and not a disorganized condition of turbulence.

Although there are several types of viscometers available, most of them do not provide for measuring both the yield value and the viscosity of the material being studied. Of those which permit such measurements, the rotational viscometer including a rotating cup containing the material and a stationary bob immersed in the material is best suited for measuring the flow characteristics of a great variety of plastics and liquids which may differ widely in viscosity, yield value and other physical characteristics. In such viscometers, a predetermined quantity of the material whose viscosity is to be determined is placed in the cup and the bob is immersed therein. The bob is suspended at the lower end of a vertical wire or spring, which has its upper end firmly clamped to a rigid arm forming part of and projecting over the instrument. When the cup is rotated at a predetermined speed, a viscous drag, due to the material in the cup, is imposed on the bob and causes it to twist around through an angle which may be measured on a suitable horizontal calibrated disc mounted on the vertical wire. This thus provides a reading of the torque in the wire-spring system. By changing the speed of rotation of the cup, different torques are produced so that data for the plotting of a flow curve (R. P. M. vs. torque) may be obtained; and from this the viscosity and yield value of the material may be determined.

All of the viscometers of the rotating cup type that are now commercially available are both inaccurate and unsuitable for measuring the flow characteristics of materials which have wide ranges of viscosity, yield value and other physical characteristics. For example, none of them includes any convenient means for readily and rapidly changing the speed of rotation of the cup so that proper flow curves may be plotted. Nor do they include any means for accurately controlling the temperature of the material during the viscosity measuring operation; hence most measurements made with prior known apparatus are inaccurate, and even meaningless, because the viscosity of practically all liquids and plastics changes greatly with small changes in temperature. Furthermore, in the presently known rotating cup viscometers, there is no way of accurately centering the bob or keeping it steady during the measuring operations. This not only causes difficulty and possible inaccuracy in the measuring operations but also renders it difficult to replace the parts in proper position after cleaning. In addition, the known rotating cup viscometers are not suited for measuring very high viscosities. Moreover, they require the use of indirect methods for calculating the wire or spring constants of the bob-supporting springs.

I have devised a rotating cup viscometer which is subject to none of the above-mentioned or other difficulties present in known viscometers of this type, and with which it is possible to make about forty changes in speed in three minutes for the plotting of accurate flow curves.

In accordance with my invention, the cup is removably but rigidly supported for rotation in a stationary, thermostatically-controlled, constant temperature bath, the driving means therefor extending upwardly into the bath from beneath the bath housing; and the bob is mounted on the lower end of an accurately mounted and centered rotatable shaft to which a calibrated cylinder is attached and the upper end of which is suitably connected to a calibrated torsional element, such as a spring. The rotatable shaft and all of the parts associated therewith are mounted upon a supporting member which is conveniently attached to the top of the bath housing and arranged so that it may be moved vertically up and down a sufficient amount to move the bob into and out of the cup, and also to allow complete removal of the cup. In addition, the supporting member has mounted thereon a wheel for facilitating the direct calibration of the torsional elements used. Means are also provided for agitating the bath constantly during the measuring operations to insure a uniform temperature throughout the bath, and a thermostatically-controlled heating element is mounted in the bath housing for maintaining the temperature at the desired point. With such an apparatus, the flow characteristics of a wide variety of liquids and plastics may be accurately and quickly measured. In fact, in a laboratory model, ranges of absolute viscosity from 1 to 24,000 poises have been handled.

The above and other features and objects of my invention will become apparent upon consideration of the following detailed description and the accompanying drawings, in which:

Fig. 2 is a perspective view of the principal part of the apparatus shown in Fig. 1, the variable speed driving mechanism being omitted;

Fig. 3 is a front elevational view, taken substantially along the line 3—3 of Fig. 1, of the bath housing shown in Fig. 2, most of the parts being shown in vertical section;

Fig. 4 is a detail vertical sectional view showing a cover for minimizing or closing the space between the top of the cup and the bob;

Fig. 5 is a wiring diagram of the electrical parts of the apparatus and particularly the bath heater and temperature regulator;

Fig. 6 is a side elevational view, partly in section, of the supporting member for the bob and the parts associated therewith; and Fig. 7 is a horizontal sectional view taken substantially along the line 7—7 of Fig. 6.

Figure 1:
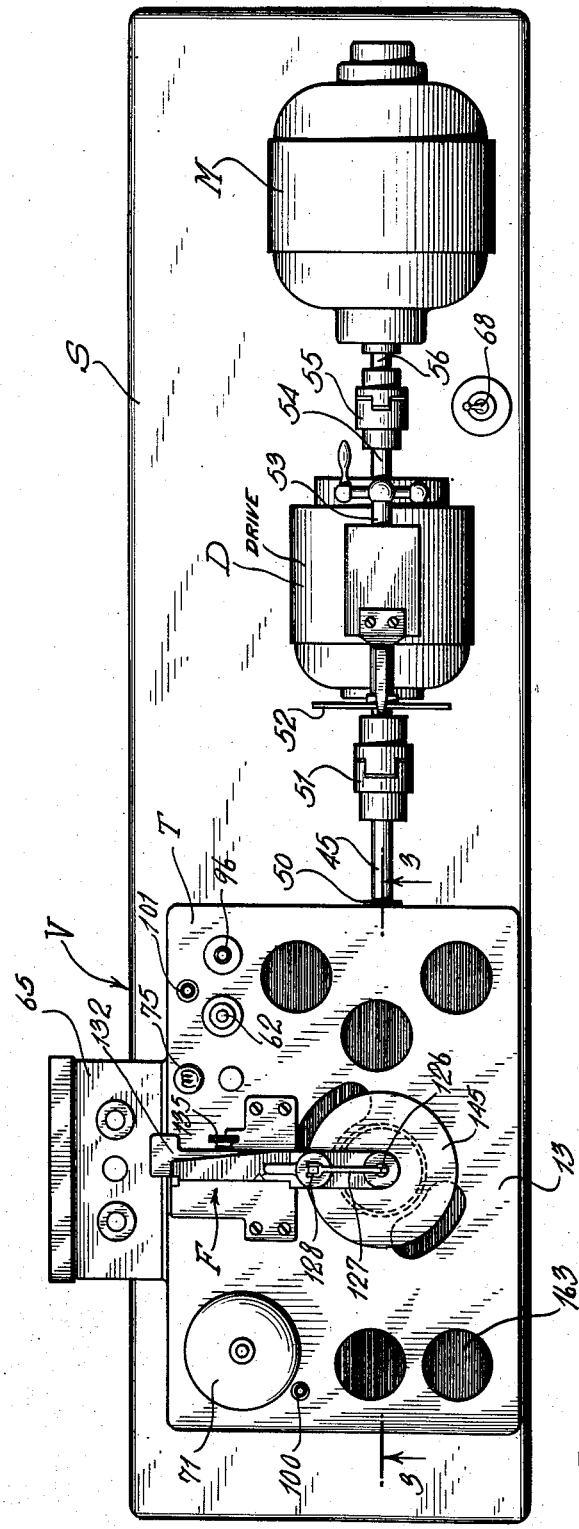
Fig. 1 is a plan view of one form of apparatus embodying the principal features of the invention.

Referring to the drawings, and particularly Figs. 1 and 2, it will be observed that my improved viscometer V comprises a thermostatically-controlled constant temperature bath T in which is mounted a rotatable cup C which receives its rotative movement in a manner to be described more fully hereinafter through a variable speed transmission or drive D and a motor M. All of the parts are mounted on a suitable base or support S so that the entire apparatus may be easily moved. The cup C is adapted to hold a predetermined quantity of the material whose flow characteristics are to be measured and to receive a bob B which is mounted on a slidably supported holding member or frame F so that it may be conveniently moved into and out of the cup C before and after the actual measuring operations.

As shown in Figs. 2 and 3, the constant temperature bath T comprises a box-like tank or housing 11 having side walls 12, a top surface or cover member 13, a bottom 14 and a substantially rectangular cut-away portion which forms a space 15 for receiving some of the operating parts for rotating the cup C. The space 15 is bounded by an upper wall 16 and side walls 17, which actually may be considered as part of the bottom 14 of the bath T, and may be closed with a suitable cover member 18, if desired.

Rotatable cup C, in the form shown in Fig. 3, comprises a cylindrical member 20 having a flange 21 on the upper edge thereof which, during rotation of the cup, is adapted to ride in a suitable circular bearing surface 22 provided in a correspondingly shaped opening in the top cover 13 of the bath T. The space between the edge of the flange 21 and the bearing surface 22 is very small and, during rotation of the cup, it is desirable to lubricate said bearing surface. If desired, an annular groove 22a may be provided in the upper surface of the flange to prevent any material which might overflow from the cup from passing over the edge of the flange and onto the bearing surface, and/or said cup may be provided with a removable flanged annular cover member 22b, as shown in Fig. 4, for almost completely closing the space between the top of the cup C and the top of the bob B. Such a flanged cover member prevents the material in the cup from flowing upwardly and out of the cup during rotation thereof. The cup C also includes a flanged bottom portion 23 which may be removably threaded to the cylindrical member 20 for facilitating cleaning of the cup, and is provided with outwardly projecting locking pins 24 in the flanged portion thereof. There are two diametrically opposed locking pins 24 in the construction shown in Fig. 3 and these are adapted to fit or lock in suitable slots 25 provided in the upper edge of a cup-supporting member 26 (somewhat similar to the manner of removably attaching the cover member 22b shown in Fig. 4). The cup-supporting member 26 is also essentially cup-shaped and has circular indentations 27 on the inside thereof which correspond to the shape of the flanges provided on the bottom 23. This construction permits the cup C to be rigidly held in said supporting member 26 which is mounted on an upper substantially conical-shaped end 28 of a vertically disposed shaft 30 and held thereon by means of a nut 31.

Shaft 30 is rotatably supported in a bearing 32 provided in a hub 33 which is formed in the top wall 16 adjacent the side wall 17, and said shaft projects downwardly into the space 15 for driving connection with the source of power. Lubricant may be supplied to an annular groove 34 formed in the bearing 32 through a passage 35 extending through the hub 33 and connected with a tube or conduit 36. Conduit 36 extends from the hub 33 through the tank 11 to a cupped fitting 37 provided in one of the side walls 12 and into which a suitable lubricant may be inserted. The upper end of the shaft 30 between the hub 33 and the bottom of the cup-supporting member 26 may be provided with a suitable packing gland 38 so that the lubricant supplied to the shaft 30 will be properly retained and will not escape into the bath T.

In addition to the above described support for the shaft 30, the portion of said shaft which extends into the space 15 is further supported in a bearing 40 provided in an angular bracket 41 attached to the side wall 17. A ball bearing 42 is provided on the shaft 30 between the bottom of the bracket 41 and a bevel gear 43 which is mounted on the lower end of said shaft for cooperation with a bevel gear 44 mounted on a main drive shaft 45. Shaft 45 also has a ball bearing 46 adjacent the bevel gear 44 and is supported in a suitable bearing 47 provided in an angular supporting bracket 48 attached to the upper wall 16 within the space 15. Additional support for the shaft 45 may be provided in a bearing 50 secured in an opening provided in the cover member 18 through which said shaft extends.

As shown in Fig. 1, shaft 45 is connected through a suitable coupling 51 with the variable speed transmission or drive D. The drive D may be of any desired conventional construction provided with an indicator or dial arrangement 52 for indicating the speed in revolutions per minute on the output side and having a manually-operated means 53 for changing the speed within predetermined limits. At the input side of the drive or transmission D, a shaft 54 is connected by means of a coupling 55 with a shaft 56 in the motor M.

It will be understood that, by means of the construction described above, the cup C may be driven at any desired predetermined speed and that such speed may be altered through a range of revolutions per minute which is governed by the characteristics of the motor M and the transmission or drive D. This is a particularly important feature of my apparatus which adapts it for use in measuring the flow characteristics of plastics where more than one force or speed is required so that data for the plotting of a flow curve may be obtained. It will also be understood that the shaft 30, which is directly connected to the cup C through the supporting member 26, is so mounted as to provide very accurate rotation of the cup.

As mentioned above and shown in Fig. 3, the cup C is disposed within the constant temperature bath T and extends downwardly below the top surface 13 of the tank 11 into a quantity or bath 60 of any suitable liquid which may be heated or cooled to a desired constant temperature. It should be realized that the accurate control of temperature during any viscosity or flow characteristic measurement is very important since the flow characteristics of most liquids and plastics are altered with each change of temperature. For example, the viscosity of a light mineral oil will be increased from 20 to 22 poises when the temperature is changed from 30° C. to 29° C. and will be decreased from 20 to 18.5 poises when the temperature is raised from 30° C. to 31° C., whereas the viscosity of a heavy mineral oil is increased from 655 to 730 poises when the temperature is changed from 30° C. to 29° C. and will be decreased from 655 to 600 poises when the temperature is raised from 30° C. to 31° C. I have found that it is desirable to make most viscosity measurements at a temperature of 30° C., which is slightly above normal room temperature, and that this temperature should be maintained within plus or minus 0.2° C. and preferably plus or minus 0.1° C. This is accomplished and the temperature of the bath liquid 60 is maintained within 0.1° C. of 30° C. in my construction by means of a conventional load heater 61 (Fig. 5) which is mounted in a suitable housing or holder 62 supported in an opening provided in the cover member 13. The heating means for the bath also includes a conventional thermostat or thermo-regulator 64 (Fig. 5) which may be included in a housing 63 supported in another opening provided in the cover member 13 and disposed within the liquid bath 60.

The thermostat or regulator 64 is selected to maintain the bath T within 0.1° C. of the desired predetermined temperature (30° C.) and, as shown in Fig. 5, is included in the regular wiring circuit for the load heater 61 and the other electrical parts of the apparatus. The necessary wiring for the apparatus may be mounted in a suitable housing 65 (Fig. 1) attached to one of the side walls 12 of the tank 11. The wiring may include a plug 66 for connecting the apparatus to a source of alternating current. A conductor 67 having a switch 68 therein connects the source of power, through a resistance 70, with one side of a small motor 71. The other side of the motor 71 is connected by conductor 72 with the source of power, and said motor 71 is mounted on suitable supports 73 attached to the cover member 13. The shaft of the motor 71 has a stirring device 74 mounted on the lower end thereof and extends downwardly through an opening provided in the top surface 13 into the liquid bath 60 for constantly agitating or stirring said bath during the operation of the apparatus and thus assuring the maintenance of the desired uniform temperature throughout the entire bath. In order that the operator of the apparatus may know when the switch 68 is closed and the electrical parts of the apparatus energized, a pilot light 75 may be connected into the switch circuit through a conductor 76 extending from one side of the light 75 to the conductor 72 and a conductor 77 extending from the other side of the light to the conductor 67 at a point between the switch 68 and the pilot light 75.

Load heater 61 is connected to an upper contact 78 of a relay 80 by means of a wire or conductor 81; and the other side of the heater is connected directly to the conductor 67 by means of a wire 82. Relay 80 also includes a lower contact 83 connected to the conductor 72, an armature 84 for establishing a connection between the contacts 78 and 83, and a coil 85. Coil 85 is connected on one side thereof directly to the main conductor 67 by a wire 86 and is connected on the other side thereof to the conductor 72 by means of a conductor 87 having a condenser 88 therein. Thus, current will normally flow through the coil 85 to cause it to be energized sufficiently to move the armature 84 into contact with the upper and lower contacts 78 and 83 and thereby energize the load heater 61.

When the temperature reaches the predetermined point as controlled and determined by the thermo-regulator 64, the coil 85 will be de-energized a sufficient amount to cause the armature 84 to open the load heater circuit. For this purpose, one side of the thermo-regulator is connected to the conductor 67 by means of a conductor 90 having a resistance 91 therein; and is connected on its other side to the conductor 87 by means of a conductor 92. A resistor 93 is shunted across the conductors 90 and 92 at a point adjacent the regulator 64. The construction of the regulator 64 and the arrangement of the above described circuits is such that when the temperature of the bath liquid 60 is raised more than 0.1° C. above the predetermined temperature (30° C.), the regulator will be actuated to close the circuit directly therethrough and thus connect conductors 90 and 92 so that the current does not pass through the resistor 93. This causes the current flowing through the relay coil 85 to drop sufficiently to open the load heater circuit between the contacts 78 and 83.

In Fig. 5, I have also shown the motor M connected to the conductors 67 and 72 by means of wires 94 and 95, respectively. This connection is at a point between the switch 68 and the plug 66 so that the motor M will be operating when the switch 68, which may be mounted in a convenient position upon the base S (Fig. 1), is closed.

In this manner, the temperature of the bath is kept substantially constant so that there will be no appreciable variation in the viscosity of the material in the cup during any measuring operation. The actual temperature at the time a measurement is made may be determined by means of a thermometer 95 mounted on the top surface 13 in a suitable holder 97 and extending through the top 13 into the bath liquid 60. Should the temperature in the place where the apparatus is located rise above the predetermined temperature as controlled by the regulator 84 and consequently raise the temperature of the bath liquid above this point, it may be necessary to circulate a cooling medium through the tank 11. I have, therefore, provided a cooling medium circulating pipe 98 in the tank 11. One end of this pipe may be connected to a suitable inlet 100 and the other end may be connected to an outlet 101. Both the inlet 100 and outlet 101 may be mounted in any convenient position on the top cover 13 so that a source of cooling medium, such as cold water, may be connected to the inlet 100, and the outlet 101 connected to a suitable drain. In this manner, the bath liquid 60 may be cooled below the temperature prevailing in the place where the apparatus is situated and below the predetermined temperature as controlled by the regulator 84 so that said regulator may function in the manner already described.

Referring now to Figs. 2 and 6, it will be noted that the bob B, in its preferred form, comprises a cylindrical member 105, of somewhat smaller diameter and height than the inside dimensions of the cup C, rigidly and concentrically mounted on the lower end of a shaft 106. This shaft extends vertically upwardly and passes through an aligned opening 107 provided in an outwardly projecting supporting shoulder 108 formed on the slidable frame F. The diameter of the elongated opening 107 is very slightly larger than the diameter of the shaft 106 so that said shaft will be well supported by the shoulder 108; and, at the upper and lower ends of the opening 107, the shaft is journalled in suitable ball bearings 110 and 111, respectively.

Above the bearing 110, the upper end of shaft 106, which is designated as 112, is reduced in diameter and provided with an axial opening for the reception of a pin 113 which is connected to the lower end of a suitable torsion member 114 and held in said opening by means of a set screw 115. In the present instance, the torsion member 114 preferably comprises a tension spring because its deflection throughout 360° may be directly proportional to the force applied, but it will be understood that a wire, metal tape or any other suitable resilient torsion member may be used even though the deflection of such torsional members is not directly proportional to force applied throughout an arc of 360°. The upper end of the torsion member or spring 114 is connected to a pin 116, similar to the pin 113, received in an opening provided in the lower end of a supporting shaft or pin 117 and held therein by means of a set screw 118. The supporting shaft 117 is in accurate axial alignment with the reduced end 112 of the shaft 106 and removably mounted in a hollow screw 120. Screw 120 is provided with a serrated turning knob 121 and is threaded into a shouldered retaining sleeve 122 which is mounted in a suitable cylindrical opening 123 provided in the outer end of an upwardly projecting supporting arm 124 also formed as part of the frame F. The upper end of the supporting shaft or pin 117 is provided with a shoulder 125 for bearing against the upper surface of the hollow screw 120 and preventing said shaft from passing downwardly therethrough.

In order to prevent the supporting shaft or pin 117 from rotating in the opening of the hollow screw 120, the top of said shaft is provided with a substantially vertically disposed groove or keyway 126 for the reception of a suitable key or locking member 127. The key 127 is provided, at its end opposite the groove 126, with a yoke 128 so that it may be pivotally connected to a supporting pin 130 which is removably mounted in an opening 131 provided in the upwardly projecting supporting arm 124. It will be apparent that the key 127 effectively prevents the upper end of the spring 114 from rotating. However, the upper end of said spring 114 may be moved vertically so as to alter the effective length of the spring by turning the serrated knob 121 of the hollow screw 120.

As mentioned above, the holding member or frame F is slidably mounted for accurate vertical movement above the constant temperature bath T so that the bob B may be moved into and out of the cup C. For this purpose, said frame F, which in addition to the supporting shoulder 108 and supporting arm 124 comprises a substantially block-shaped member 132, is provided with an elongated vertically disposed slot 133 which is centrally disposed in the block-shaped member 132 and extends substantially throughout the length thereof. Said slot 133 is provided, on one face of the block-shaped member 132, with a raised and machined ridge 134 around the edge thereof and is adapted to receive one or more headed thumb screws 135 (Fig. 1). The thumb screws 135 are threaded into openings provided in the side face of an upwardly projecting supporting arm 136 and bear against the machined surface of the ridge 134 so as to hold the rectangular member 132 in firm contact with said side face of the supporting member 136. Supporting arm 136 has a base or foot 137 formed thereon so that it may be attached in proper position upon the cover 13 of the tank 11.

To insure an acurate vertical sliding movement of the frame F upon the side face of the supporting arm 136, said arm is provided with an elongated guiding ridge 138. As shown in Fig. 7, this ridge may be triangular in shape and is received in a correspondingly shaped groove 140 formed in the inside face of the rectangular member 132. If desired, the single ridge 138 may be replaced by a plurality of aligned individual ridges, as indicated in Fig. 2.

It will be understood that it is important to regulate the downward position of the bob B in the cup C when the frame F is moved at the start of a measuring operation. I have, therefore, provided a lug 141 on the outside face of the rectangular member 132. This lug 141 is positioned near the lower extremity of the said member 132 and is provided with a threaded opening for the reception of an adjustable stop screw 142. The stop screw 142 is adapted to bear against a suitable machined surface 143 (Fig. 2) provided on the base 137 of the supporting arm 136 and thus adjustably limits the downward movement of the bob B into the cup C.

When the bob B is lowered into its proper position in the cup C which has a quantity of liquid or plastic therein whose viscosity is to be measured, the rotation of the cup C will be transmitted to the bob B through the liquid or plastic contained in said cup. The rotation of the bob B will continue until the torque built up by the twisting of the spring 114 matches the force imposed on the bob B by the viscous drag of the liquid at the particular speed (R. P. M.) of rotation of the cup C then being used. The amount of rotation or displacement will depend in part upon the characteristics of the spring 114 and the amount or number of degrees of rotation of the bob B will furnish one point in the flow curve determining the rheological properties of the liquid or plastic. Actually, the number of degrees of rotation of the bob B is a measure of the torque applied to the system and from a torque-R. P. M. curve the viscosity and yield value may be computed.

For indicating the number of degrees of rotation or displacement of the bob B that takes place at each speed of rotation of the cup C used in a measuring operation, I have provided a cylindrical scale holding member 145 having an axial hub 146 so that it may be removably attached to the shaft 106 by means of a set screw 147. As shown in Fig. 6, the scale holding member 145 is mounted on the shaft 106 at a position between the ball bearing 110 and the ball bearing 111, and disposed in a suitable cut-out portion 148 provided in the supporting shoulder 108. The lower portion of the cylindrical wall of the member 145 has an annular plate 150 rotatably mounted in any convenient manner on the outside thereof and marked on its face with a suitable scale or indicia 151 (Fig. 2) to provide an indication of the amount of rotation or displacement of the shaft 106 and bob B. This annular plate having the indicia thereon constitutes the scale for measuring the deflection of the torsion member 114 and is preferably only frictionally held on the cylindrical wall of the member 145 so that it may be easily rotated to adjust the zero position for each torsion member 114 that is used. The scale 151 cooperates with a suitable pointer 152 attached to the side of the shoulder 108 by means of screws 153.

As explained above, the amount of rotation or displacement of the shaft 106 which takes place during a measuring operation depends in part upon the physical characteristics of spring 114. In making a measurement, it is undesirable to permit the bob B to rotate more than about 360°. Consequently, in order that the apparatus may be used for measuring wide ranges of viscosity (from 1 to 24,000 poises), torsion members 114 having different characteristics and some convenient means of calibrating such torsion members should be provided. Prior known methods of calibrating the torsion members are both indirect and inaccurate and usually involve a comparison with and working back from materials, such as standard oils, of known viscosity. In my construction, I have greatly simplified the calibration procedure and any torsion member 114 may be calibrated with reference to the indicia 151 directly in the apparatus itself without using standard oils or the like. It will be noted that the upper portion of the outside cylindrical surface of the member 145 is provided with a helical groove or screw thread 154 and a small opening 155 near the top of said member. Whenever a new torsion member, such as the spring 114, is used in the apparatus, a string or cord 156 may be wound in the helical groove 154 and have one end secured to the member 145 by passing it through the opening 155. The other end of the cord 156 extends substantially horizontally from the member 145 and passes over a wheel or pulley 157 pivotally mounted at 158 upon the rear edge of the block-shaped member 132. By attaching a plurality of known weights 160 to the end of the cord 156, the amount of force required to rotate or displace the shaft 106 through different angles may be easily computed; and from this the amount of force or the torque required to turn or twist the spring 114 or other torsion member over each unit of the scale 151 may be figured.

While it is believed that the operation of the apparatus will be apparent from the foregoing description, for the sake of clarity, the procedure in making a complete measurement to obtain the necessary data for plotting a flow curve will now be described.

First, a quantity of the material whose flow characteristics are to be measured is placed in one of the cups C which is then inserted in the cup-supporting member 26 and the switch 68 closed so as to heat the bath liquid 60 to the predetermined temperature of operation. The cup C containing the liquid is preferably allowed to remain in the heated bath for a period of about a half hour so that the cup and the material contained therein will have the proper temperature. Next, a spring 114 is inserted in the apparatus and adjusted by turning the knob 121 until the distance between the top of the upper reduced end 112 of the shaft 106 and the bottom of the supporting shaft or pin 117 is the same as that at which the spring 114 was calibrated, for example six inches in the apparatus shown (or if desired, this adjustment of distance may be made before inserting the spring). The shaft 106 is then rotated through one complete turn (360°), returned slowly and the scale 151 set to zero with reference to the pointer 152. When this is done, it is also desirable to readjust the position of a movable stop finger 161 (Figs. 2 and 6) which cooperates with a downwardly projecting pin 162 so that the shaft will be permitted to rotate, at most, 360° or through any other smaller arc that will avoid permanently overstraining the torsion member.

At this point, the apparatus is ready for the actual measurement and the bob B may be lowered into the cup, the rotation of which has started at slow speed. Any excess material overflowing from the cup is then removed and a cover 22b applied to the cup, if desired. The transmission is next shut off and the apparatus is allowed to remain idle for about five minutes. A reading may then be started by setting the transmission at five revolutions per minute and noting the amount of the deflection of the spring 114 on the scale 151. After recording this reading, the speed of the transmission is increased to ten revolutions per minute and a second reading taken. This is repeated at intervals of five revolutions per minute to a predetermined maximum, and at similar intervals in a decreasing series back to the starting point. However, the decreasing series need not be completed if the readings are the same as those obtained in the increasing series. From the data recorded during these measurements, revolutions per minute vs. degrees of rotation are plotted, thus giving a flow curve for the particular material under consideration. From this curve, the yield value and plastic viscosity (viscosity in the case of true liquids) are calculated by the Marcus Reiner formulas (see "The theory of plastic flow in the rotation viscometer," by Marcus Reiner, 1929, vol. I, Journal of Rheology, pages 5–10). It will be understood that where the curve plotted from the decreasing series data does not coincide with that plotted from the increasing series data and forms a hysteresis loop, the material measured is thixotropic and the curve loop will provide an indication or measure of the magnitude of the thixotropic condition.

If further measurements of other materials are to be made, additional cups C containing the test materials may be preheated during the measuring operations by inserting them in openings 163 provided in the top surface 13 of the tank 11. I have provided four openings 163 so that five cups may be initially heated and measurements made continuously by inserting a new cup each time a measurement is completed. In this manner, data for the plotting of flow curves for many different materials may be quickly and efficiently obtained since it is possible to make about fifteen changes of speed per minute in the apparatus.

While I have discussed the details of construction and operation of my improved apparatus with particular reference to its use in obtaining data for determining the yield value and plastic viscosity of plastics and the viscosity of true liquids, I wish it to be understood that the apparatus may be used in studying other flow characteristics of materials. For example, the apparatus lends itself well to the making of studies in thixotropy which is associated with any hysteresis loop between the up and down curves, as mentioned above. Furthermore, although I have described but one embodiment of the essential features of my invention, it is to be understood that various changes may be made in the construction and certain features thereof may be employed without others without departing from my invention or sacrificing any of its advantages.

What I claim is:

1. In an apparatus for use in determining the flow characteristics of liquid and plastic materials, the combination of a heating bath, a container disposed in said bath for holding a quantity of the material whose flow characteristics are to be determined, means for rotating said container, a supporting member arranged above said container, a vertically disposed shaft rotatably but rigidly mounted in said supporting member and disposed centrally with respect to said container, a bob mounted on the end of said shaft and adapted to be positioned centrally within said container, and a torsion member connected to said shaft so that rotation of said bob will cause deflection of said torsion member.

2. In an apparatus for use in determining the flow characteristics of liquid and plastic materials, the combination of a heating bath, a container disposed in said bath for holding a quantity of the material whose flow characteristics are to be determined, means for rotating said container, a supporting member arranged above said container, a vertically disposed shaft rotatably but rigidly mounted in said supporting member and disposed centrally with respect to said container, a bob mounted on the end of said shaft and adapted to be positioned centrally within said container, a torsion member connected to said shaft so that rotation of said bob will cause deflection of the torsion member, and means mounted on said shaft for measuring the rotative displacement of said bob produced by rotation of the material in said container.

3. In an apparatus for use in determining the flow characteristics of liquid and plastic materials, the combination of a heating bath, a container disposed in said bath for holding a quantity of the material whose flow characteristics are to be determined, means for rotating said container, a supporting member arranged above said container and adapted to be moved vertically upwardly and downwardly with respect to said container, a vertically disposed shaft rotatably but rigidly mounted in said supporting member and disposed centrally with respect to said container, a bob mounted on the end of said shaft and adapted to be positioned centrally within said container, and a torsion member connected to said shaft so that rotation of said bob will cause deflection of said torsion member.

4. In an apparatus for use in determining the flow characteristics of liquid and plastic materials, the combination of a housing adapted to hold a liquid heating bath, a container disposed in said housing for holding a quantity of the material whose flow characteristics are to be determined, means for rotating said container, a supporting member mounted on said housing above said container, a vertically disposed shaft rotatably but rigidly mounted in said supporting member and disposed centrally with respect to said container, a bob mounted on the end of said shaft and adapted to be positioned centrally within said container, a torsion member connected to said shaft so that the rotation of said bob will cause deflection of said torsion member, a circular scale mounted on said shaft, and means associated with said scale and said supporting member for permitting calibration of said torsion member.

5. In an apparatus for use in determining the flow characteristics of liquid and plastic materials, the combination of a housing adapted to hold a liquid heating bath, a first vertically disposed shaft mounted for rotation in said housing, a cylindrical cup removably mounted on the upper end of said shaft for holding a quantity of the material whose flow characteristics are to be determined, means for rotating said shaft, a supporting member mounted on said housing above said cylindrical cup, a second vertically disposed shaft rotatably but rigidly mounted in said supporting member and disposed in axial alignment with said first shaft, a cylindrical bob mounted on the end of said second shaft and adapted to be positioned within said cup, and a torsion member connected to said second shaft so that the rotation of said bob will cause deflection of said torsion member.

6. In an apparatus for use in determining the flow characteristics of liquid and plastic materials, a combination of a housing adapted to hold a liquid heating bath, a cup disposed in said housing for holding a quantity of the material whose flow characteristics are to be determined, means for rotating said cup, a supporting member mounted on said housing, a vertically movable frame mounted on said supporting member, a vertically disposed shaft rotatably but rigidly mounted in said frame and disposed centrally with respect to said cup, a bob mounted on the end of said shaft and adapted to be positioned centrally within said cup, and a torsion member connected to said shaft so that the rotation of said bob will cause deflection of said torsion member.

7. In an apparatus for use in determining the flow characteristics of liquid and plastic materials, a combination of a housing adapted to hold a liquid heating bath, a cup disposed in said housing for holding a quantity of the material whose flow characteristics are to be determined, means for rotating said cup, a supporting member mounted on said housing, a vertically movable frame mounted on said supporting member, a vertically disposed shaft rotatably but rigidly mounted in said frame and disposed centrally with respect to said cup, a bob mounted on the end of said shaft and adapted to be positioned centrally within said cup, means for limiting the downwardly vertical movement of said frame on said supporting member, and a torsion member connected to said shaft so that rotation of said bob will cause deflection of said torsion member.

8. In an apparatus for use in determining the flow characteristics of liquid and plastic materials the combination of a housing adapted to hold a liquid heating bath, means for maintaining said liquid heating bath at a substantially constant predetermined temperature, a first vertically disposed shaft mounted for rotation in said housing and having a holder on the upper end thereof, a cylindrical cup removably mounted in said holder and adapted to hold a quantity of the material whose flow characteristics are to be determined, means for rotating said first shaft at a plurality of different speeds, a supporting member mounted on the upper side of said housing, a vertically movable frame mounted on said supporting member, a second vertically disposed shaft rotatably but rigidly mounted in said frame and disposed in axial alignment with said first shaft, a cylindrical bob mounted on the end of said second shaft and adapted to be positioned centrally within said cup, means for limiting the downward movement of said frame member, a helical spring connected to the upper end of said second shaft so that rotation of said bob produced by rotation of the material in said cup will cause deflection of said helical spring, and a circular scale mounted on said shaft for measuring the rotative displacement of said bob and said helical spring.

HENRY GREEN.